July 30, 1968 W. B. DUFFY 3,394,747
CAPTIVE-BOLT ASSEMBLY
Filed July 15, 1966 2 Sheets-Sheet 1

INVENTOR
William B Duffy
BY
Charles F. Chisholm
ATTORNEY

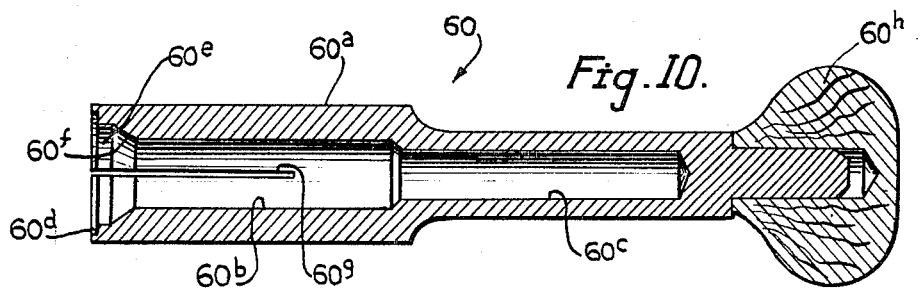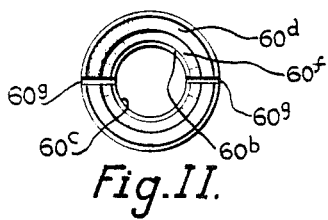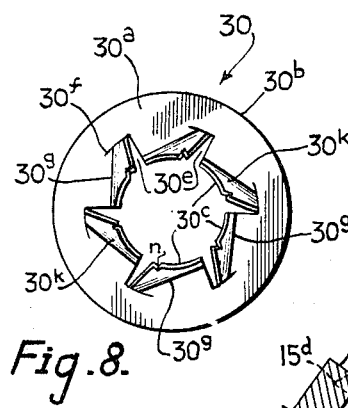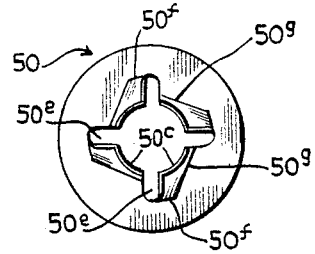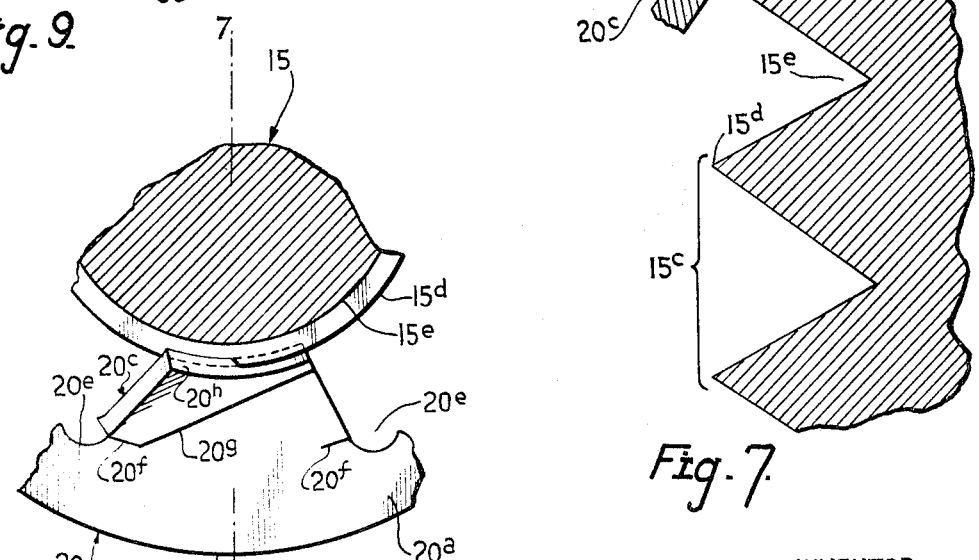

United States Patent Office 3,394,747
Patented July 30, 1968

3,394,747
CAPTIVE-BOLT ASSEMBLY
William B. Duffy, Berkeley Heights, N.J., assignor to United-Carr Incorporated, Boston, Mass., a corporation of Delaware
Filed July 15, 1966, Ser. No. 565,627
9 Claims. (Cl. 151—69)

ABSTRACT OF THE DISCLOSURE

A bolt passes through a member that is to be bolted to a second member and is held captive to the member. The bolt has a conventional right-hand helical thread and is held captive by a retainer which has steep left-hand teeth, i.e., the teeth of the retainer have steep helical edges which would mate with a male thread that was much coarser than the conventional thread of the bolt. The teeth of the retainer extend diagonally across the thread of the bolt, the teeth being resiliently pressed against the crest of the thread of the bolt. The teeth are bent from the body of the retainer in the direction opposite to the direction of advance of the retainer on the bolt.

---

The retainer is pushed longitudinally onto the bolt, and firmly resists reverse longitudinal movement that would retract it on the bolt. When the retainer is advanced longitudinally on the bolt, the left-hand teeth of the retainer ride the crest of the right-hand bolt thread. When reverse force is applied to the retainer, i.e., in the direction that would tend to retract the retainer on the bolt, the teeth of the retainer grip the bolt by toggle action, the bolt-engaging edges of the teeth digging into the crest of the bolt thread where the left-hand helical edges of the teeth cross the crest of the right-hand helical edge of the bolt thread.

Background of the invention

Captive-bolt assemblies are used in many connections, and there are various such assemblies having advantages and disadvantages for particular uses. Typically, one or more bolts pass through a member that is to be bolted to a second member, and a bolt retainer holds each bolt captive until such time as the bolt or bolts are used to bolt the first member to the second member.

Some captive-bolt assemblies are more expensive than is desirable for certain uses. In some the holding force of the bolt retainer is weaker than is desirable for certain uses. In some the retainer can be advanced longitudinally on the bolt only in increments; and to obtain uniform tightness of the applied bolt retainer it is necessary to resort to the further step of tightening down the retainer by rotating either the bolt or the retainer. For some commercial uses this further step is undesirable.

Captive-bolt assemblies are customarily made in advance, and shipped or transported before being used. When used, the free ends of the captive bolts are telescoped through bolt holes in a support or other member to which the first member is to be bolted. Then conventional threaded nuts are applied to the bolts and tightened down to bolt the two members together. This results in each bolt-retainer being clamped between the two members. Unless the retainer can receive such clamping pressure and provide adequate areas of contact with the two members, as distinguished from contact at localized high spots, looseness can be expected to develop in the over-all assembly.

By way of illustration and example, the captive-bolt assembly of the present invention may be used in the assembly-line mounting of automobile bumpers. Typically, bolts are used toward each end of the bumper to bolt it to mounting brackets that are on the car-chassis. Before being dispatched to the assembly line, the bumper may be provided with captive bolts that are to be used to bolt the bumper to the mounting brackets. For facile mounting of the bumper, the bolts must project perpendicularly from the bumper without wobble or tilt. In the automobile field small fractions of pennies count. The captive-bolt assemblies of the bumper should desirably be of minimum cost. Not only should the bolt retainer be inexpensive, but the captive-bolt assembly should desirably be one which can be quickly made without an extra operation. Having in mind the rough handling that a bumper can be expected to receive between the time it is provided with captive bolts and the time it is mounted on the car-chassis, the retainers should hold the bolts snugly so that the bumper will arrive on the assembly line with the bolts projecting perpendicularly from the bumper without wobble or tilt.

Description of the embodiments that are preferred at the present time

The term "bolt" will be used to designate a threaded male member of any diameter having a head or equivalent enlargement. The bolt will be said to be "seated" in a bolt hole in a member when the bolt is fully inserted, with the head against one face of the member and the shank projecting from the opposite face of the member. In both the description and claims parts at times may be identified by specific names for convenience and ready understanding, but such nomenclature is to be understood as having the broadest meaning consistent with the context and with the concept of the invention as distinguished from the pertinent prior art. Except as otherwise indicated, the description hereinafter refers to the particular form or forms of the invention shown in the drawings; it does not necessarily refer to any other form in which the invention may be embodied. The claims, however, do embrace other forms in which the invention may be embodied.

The best modes thus far contemplated of carrying out the invention are herein disclosed. Nevertheless the disclosure is by way of illustration and example since other specific modes are possible and in some instances it may be sufficient to realize only some of the advantages of the invention.

The captive-bolt assembly may be used in any oriented position. In actual practice the axis of the bolt will extend horizontally in many instances. However, the description of the invention and the reference to the drawings will be simplified if certain assumptions are made as to the oriented position. To this end, the drawings will be referred to on the basis of the bolt axis extending vertically with the head of the bolt at the bottom and the bolt-retainer being applied to the bolt by being pushed downwardly onto the bolt. Reference to "advance" of the retainer on the bolt means movement toward the head of the bolt. Reference to force that would tend to "retract" the retainer on the bolt means force that would tend to move the fastener away from the head of the bolt.

In the drawings the thickness of the sheet material of the retainer is necessarily exaggerated.

FIGURE 1 of the drawings is an elevation, partially in section, showing a captive-bolt assembly embodying the invention.

FIGURE 6 is a fragmentary detail view, partially in top plan and partially in horizontal section. The view shows, on a greatly enlarged scale, the manner in which a retainer tooth of my captive-bolt assembly digs into the crest of the thread of the bolt.

FIGURE 7 is a fragmentary detail section showing the digging of the retainer tooth into the crest of the bolt thread. The view, which is on a greatly enlarged scale, shows the dig-in of the tooth at line 7—7 of FIGURE 6.

FIGURE 8 is a top plan view similar to FIGURE 2 showing a second specific form of bolt-retainer for making a captive-bolt assembly embodying the invention.

FIGURE 9 is a top plan view similar to FIGURE 2 showing a third specific form of bolt retainer for making a captive-bolt assembly embodying the invention.

FIGURE 10 is a longitudinal sectional view of a hand tool which may be used to push the retainer onto a bolt when making a captive-bolt assembly embodying the invention.

FIGURE 11 is a view of the retainer-receiving end of the tool of FIGURE 10 as that end appears when viewed from the left of FIGURE 10.

Figure 5:
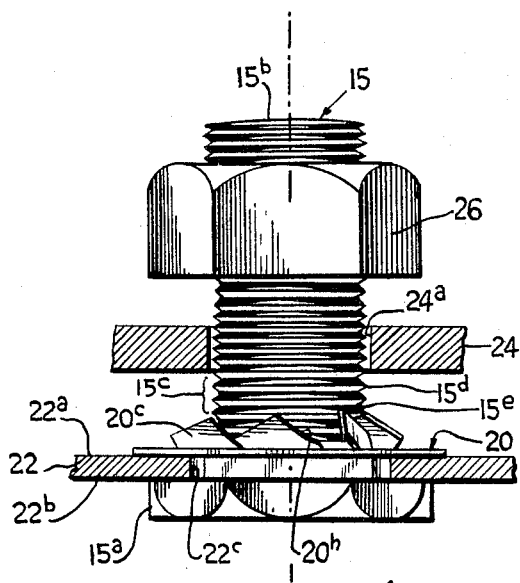
FIGURE 5 is an elevation, partially in section, illustrating the use of the captive bolt of FIGURE 1 to bolt the bolt-pierced member of FIGURE 1 to a second member.

Reference will first be had to FIGURES 1–5.

A bolt 15 has a head 15a and a shank 15b. The head 15a, while shown as a conventional hexagonal head, will be of whatever configuration is desired for the particular use that is to be made of the captive-bolt assembly. The shank of the bolt is provided with a conventional right-hand thread 15c, the crest of which is designated by 15d and the groove of which is designated by 15e. The longitudinal axis of the bolt, which extends centrally of the head 15a and shank 15b, is indicated by the phantom line 15f.

A member 22, which is to be bolted to a second member 24, has opposite faces 22a and 22b that are parallel to each other. One or more bolt holes 22c pass through the member 22, the axis of each hole 22c being perpendicular to the faces 20a and 20b. A bolt 15 is seated in each hole 22c, i.e,. the bolt is fully inserted, with the head against face 22b and the shank extending perpendicularly from face 22a.

A waferlike retainer 20 of resilient sheet material is telescoped onto the bolt 15 and resiliently grips the bolt, as will be explained. The retainer 20 has a flat annular body 20a, which has a circular outer edge 20b. The inner periphery of the annular body 20a is provided with six bolt-engaging teeth that are all alike. The reference character 20c is used to designate any tooth as a whole.

Figure 1:
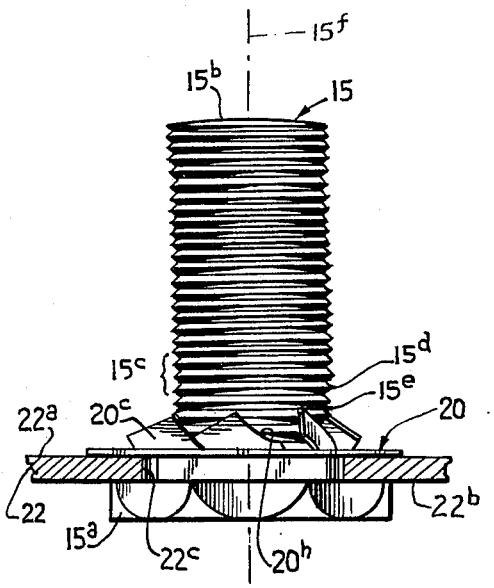
Figure 2:
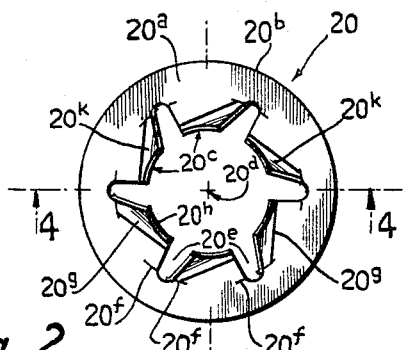
FIGURE 2 is a top plan view, on a somewhat smaller scale, of the bolt-retainer of FIGURE 1 before application to the bolt.

In FIGURE 2 the axis of the retainer 20 extends perpendicularly to the paper at the center 20d of the circle constituting the outer edge 20b of the retainer. When the retainer has been pushed onto the bolt, the retainer axis coincides with the longitudinal axis of the bolt, the bolt axis being indicated by the phantom line 15f in FIGURES 1 and 5.

In blanking out the retainer 20, spokelike portions of material are removed to provide the retainer with six equally-spaced radial slots 20e. Circumferentially, each tooth 20c extends from one slot 20e to the next slot 20e. From the slots 20e slits 20f extend circumferentially in opposite directions into the roots of the teeth 20c. These slits 20f increase the flexibility of the teeth and thereby facilitate the pushing of the retainer onto the bolt.

The teeth 20c are steep left-hand teeth, i.e., each tooth has a helical bolt-confronting edge 20h which would mate with a left-hand bolt thread if the bolt thread were steep enough. However, the steepness of each tooth 20c, i.e., the inclination of edge 20h to a plane perpendicular to the bolt axis (and also the retainer axis) is much greater than the inclination of a conventional thread. Also all of the teeth 20c are at the same level, which gives each tooth its own individual helix. Each tooth 20c presents to the bolt the innermost corner of its edge 20h. In making the retainer I shear the sheet material in the direction that will place the shearing burr at the tooth-corner that is presented to the bolt.

Figure 4:
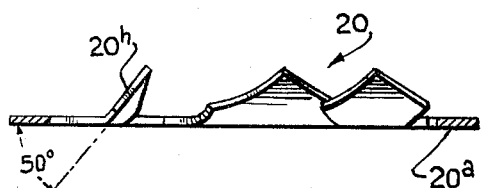
FIGURE 4 is a vertical section of the retainer of FIGURES 1–3, taken on the line 4—4 of FIGURE 2 and drawn to a larger scale.
Figure 3:
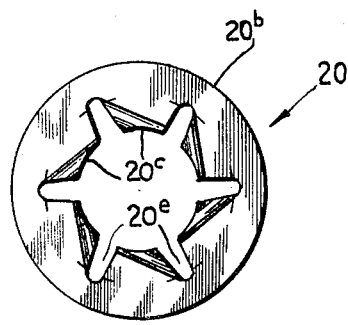
FIGURE 3 is a plan view of the retainer of FIGURE 2 turned bottom side up.

Each tooth 20c is bent upwardly to the extent that the bolt-adjacent portion 20k thereof is bent upwardly from the flat body 20a about a straight bend-line 20g which inclines outwardly from the retainer axis as the retainer is traversed clockwise in FIGURE 2. Proceeding clockwise in FIGURE 2, each bend line 20g extends from one radial slot 20e, near the open end of that slot, to the slit 20f which is near the bottom of the next slot 20e and which continues to the next radial slot 20e. The bent-up portion 20k extends circumferentially from one slot 20e to the next slot 20e and includes the entire bolt-engaging edge 20h. A suitable upward bend of the tooth is 50°, as is indicated in FIGURE 4.

The bending of the teeth from the flat retainer-body 20a is all in one direction and, being upward, gives the bottom of hte retainer a funnellike form (see FIGURE 3) which makes it easy to start the retainer onto the end of the bolt. When the retainer is pushed onto the bolt the teeth 20c are flexed upwardly and outwardly somewhat by their engagement with the bolt. As the retainer is advanced on the bolt, the bolt-confronting edges 20h of the teeth ride the crest 15d of the bolt thread, the teeth sliding from convolution to convolution of the bolt thread. Since the teeth 20c are flexed outwardly by their engagement with the crest of the bolt thread, the reactive force resiliently presses the teeth against the crest of the bolt thread.

As viewed in FIGURE 2 the inner circumference of the retainer, defined by the bolt-confronting edges of the teeth 20e, is circular or substantially so. The low end of each tooth-edge 20h (counterclockwise end in FIGURE 2) is nearer to the bend line 20g than the high end (clockwise end in FIGURE 2). The result is that, upon application of the retainer to the bolt, the low end of the tooth does not flex upwardly and outwardly as readily as the high end. For smoother sliding of the teeth from convolution to convolution as the retainer is advanced on the bolt thread, the low end of each tooth edge 20h may be placed several thousandths of an inch farther from the axis 20d than the high end, the entire edge 20h being at a distance from the axis 20d which is somewhat less than a radius of the crest of the bolt thread and the distance of the tooth-edge 20h from the axis 20d increasing uniformly from the low end to the high end.

The helix of each bolt-engaging edge 20h being a steep left-hand helix, the tooth-edge 20h extends diagonally across the tread of the bolt. The bolt thread is quite fine, i.e. the right-hand helix of the bolt thread has quite a number of convolutions per inch of axial length of the bolt, for some bolts sixteen or more. Each left-hand helix on which a tooth 20c of the retainer lies is quite coarse, i.e., such helix has a small number of convolutions per inch of axial length of the bolt—for some retainers three convolutions or less per inch of axial length of the bolt and, in some instances, less than one convolution per inch of axial length of the bolt. It is preferred that the bolt-engaging edge 20h of each tooth span approximately 1½ convolutions of the coarsest bolt thread for which the retainer is intended.

Since the bolt-engaging edge 20h of each retainer tooth extends diagonally crosswise of the crest of the bolt thread, the area of engagement between the retainer tooth and the bolt thread is exceedingly small. Thus, even relatively small reactive pressure will cause the tooth to dig into the crest of the bolt thread. Upon force being applied to the retainer 20 in a direction tending to retract the retainer on the bolt, the opposed teeth 20c act in toggle fashion and cause the teeth to dig firmly into the crest of the bolt thread, thereby preventing nondestructive retraction of the retainer on the bolt.

Reference will now be had to FIGURES 6 and 7 which, on a greatly enlarged scale, show a single tooth 20c digging into the crest of the bolt thread 15c. In FIGURE 6 the tooth 20c is seen in top plan view and a single convolution of the bolt thread is seen in top plan view. FIGURE 7 shows the configuration in a particular sectional plane that is perpendicular to the plane of FIGURE 6, viz. the vertical plane that is indicated by the line 7—7 in FIGURE 6. As has been explained, the tooth 20c extends diagonally across the crest 15d of the bolt thread. In FIGURE 6 the left-hand portion of the bolt-engaging edge 20h of the tooth is above the convolution of the bolt thread that is shown in FIGURE 6 while the right-hand portion of the bolt-engaging edge 20h is below the convolution of the bolt thread that is shown in FIGURE 6. The lower (inner) corner of the bolt-engaging tooth-edge 20h has dug into the crest 15d of the bolt thread, as is indicated in FIGURE 6 and perhaps better indicated in FIGURE 7.

In FIGURE 5 the captive-bolt assembly of FIGURE 1 is being utilized; the member 22 of the captive-bolt assembly is being bolted to a second member 24 by the captive bolt 15. In making the captive-bolt assembly of FIGURE 1 the retainer 20 was pushed onto the bolt 15 and brought firmly against the face 22a of member 22. In bringing the retainer against the face 22a the teeth 20c of the retainer may be crowded somewhat toward the member 22, within the elastic limit, so that the retainer will not only resiliently grasp the bolt but will tension the bolt somewhat with definite frictional engagement between the member 22 and the bolt head 15a on one side thereof and the retainer 20 on the other side thereof. Before the bolt 15 is inserted through the second member 24 the bolt is held captive to the first member 22, extending perpendicularly from the face 22a thereof without wobble or tilt. In some captive-bolt assemblies the hole 22c will be of a size and shape affording lateral adjustment of the bolt 15 in the hole 22c and, upon lateral adjustment being made, the adjustment is maintained by the frictional engagement between the member 22 and the bolt head 15a and retainer 20.

The members 22 and 24 shown in FIGURE 5 are diagrammatic illustrations of any suitable first and second members where first and second members are to be bolted together. For example, member 22 may be an automobile bumper that is to be bolted to a mounting bracket 24. Alternatively, members 22 and 24 may be other parts, automotive or nonautomotive, which are to be bolted together. The captive-bolt assembly may be one in which the bolt is either large or small, even of machine-screw size. Ordinarily there will be a series of captive-bolt assemblies made by bolts 15 and retainers 20 that are applied to different portions of member 22, one of which captive-bolt assemblies is shown in FIGURE 5. The bolt of each such assembly will be inserted into an individual bolt hole 24a (one shown) in the second member 24. In some instances lateral adjustment of a bolt 15 in its bolt hole 22c, as already referred to, may be desirable to register the bolt 15 with the hole 24a in the second member 24.

The captive-bolt assemblies having been made in advance, the member 22 is applied to the second member 24, each bolt 15 being inserted through its bolt hole 24a in the second member 24, as indicated in FIGURE 5 for one bolt 15. Then a nut 26 (one shown) is screwed on each bolt 15 and tightened down to draw the members 22 and 24 tightly together with the retainer 20 firmly clamped between the member 22 and the second member 24. The clamping pressure between the members 22 and 24 flattens the teeth 20c of each retainer by bending them back into the plane of the body 20a of the retainer, the bolt-engaging edges 20h of the teeth settling into the groove 15e of the bolt thread. In some instances the innermost corners of some of the flattened retainer-teeth 20c will extend upwardly into the space between the bolt and the wall of the bolt hole 24a in member 24. The thus clamped and flattened retainer 20 is in effect a flat washer which provides a large area of contact with each of the members 22 and 24, as distinguished from contact at localized high spots. As a result of the high clamping pressure over large areas of contact, looseness in the assembly of members 22 and 24 is unlikely to develop later on.

In FIGURE 2 the retainer 20 has two circumferential slits 20f which extend into the root of each retainer tooth 20c from the opposite sides of the tooth. Where a less flexible tooth is desired, the slit 20f which does not intersect the bend line 20g may be omitted. FIGURE 8 shows a modified retainer in which, among other things, there is only one circumferential slit extending into the root of each tooth.

The retainer of FIGURE 8 is similar to the retainer of FIGURE 2, and corresponding parts will be designated by corresponding reference characters with the base reference character 20 of FIGURE 2 being changed to 30 in FIGURE 8. In blanking out the retainer 30 of FIGURE 8, no spokelike pieces of material are removed; instead the blank is radially slit. When the portions 30k of the teeth are bent upwardly about the straight bend-lines 30g the slits open up into narrow V-shaped slots 30e. A circumferential slit 30f extends into the root of each tooth 30c and intersects the bend line 30g. The upper corner of each tooth 30c has a small notch n which is greatly exaggerated in FIGURE 8. This small notch is nonfunctional and results from a slight offset that is introduced into the blanking operation to facilitate tool maintenance. Except for the differences that have been indicated, the retainer of FIGURE 8 is the same as the retainer of FIGURES 1–5.

FIGURE 9 shows a retainer which is similar to the retainer of FIGURES 1–5, and corresponding parts will be designated by corresponding reference characters with the base reference character 20 of FIGURE 2 being changed to 50 in FIGURE 9. The retainer 50 has only four bolt-engaging teeth 50c. In blanking out this retainer, spokelike portions of metal are removed, with the result that the retainer has radial slots 50e that are similar to the slots 20e in FIGURE 2. A single slit 50f extends circumferentially into the root of each tooth and intersects the bend line 50g of the tooth.

It is contemplated that in some instances nonmetallic resilient materials may be used in making my captive-bolt assembly. For example, the bolt might be made of plastic, e.g., high-impact plastic, with the retainer being made of either resilient plastic or resilient sheet metal. In my work, however, I have used a metal bolt and a metal retainer, the metal of the bolt being softer than the metal of the retainer. Specifically, I have used a mild steel bolt and a retainer made from sheet spring-steel of suitable thickness. When the retainer is formed, the spring steel is in an annealed state and, after forming, the retainer is hardened and tempered. I contemplate using the retainers 20 and 30 for bolt sizes of ¼ inch diameter and larger, and the retainer 50 for machine screw sizes of #12 and smaller.

FIGURES 10 and 11 show a hand tool which may be used to push the retainer onto the bolt. The tool 60 has an elongated tool-steel body 60a with a wooden handle 60b at one end. The body 60a has a bore 60b to telescope over the bolt, and has a bore 60c which reduces weight. The open end of the body 60 is provided with an annular seat 60d which receives the peripheral margin of the retainer, and is provided with an annular space 60e within which the teeth of the retainer nest. A tapered bore 60f connects the annular space 60e with the bolt-receiving bore 60b. The body 60 is diametrically slotted at 60g to form two separate poles for better magnetization of the tool to hold a ferrous retainer.

With the retainer inserted into the mouth of the tool 60, with the rim of the retainer in the annular seat 60d and the teeth of the retainer in the annular space 60e, the tool and retainer are telescoped onto the bolt. Upon withdrawal of the tool the retainer is left in the assembled position shown in FIGURE 1. The tool may be so proportioned in relation to the retainer teeth that, upon the retainer being forced home to the position shown in FIGURE 1, the teeth of the retainer will be crowded somewhat toward the member 22 as already mentioned.

I claim:
1. A captive-bolt assembly comprising:
   a member that is to be bolted to a second member,
      said member having a bolt hole therethrough and having, perpendicularly to the axis of said bolt hole, a face which is to confront the second member;
   a bolt seated in said bolt hole and projecting perpendicularly from said face which is to confront the second member,
      said bolt having a conventional right-hand thread;
   and a bolt retainer having a series of left-hand teeth which are provided with thread-engaging edges that are resiliently pressed against the crest of the right-hand thread of the bolt and span more than one convolution of the thread of the bolt, the engagement of the retainer teeth with the bolt thread being limited to engagement of said thread-engaging edges with the crest of the bolt thread,
      the retainer being composed of resilient sheet material and having a body which embraces the bolt,
         the body of the retainer being disposed perpendicularly to the axis of the bolt and being against said face which is to confront the second member,
         said thread-engaging edges of the teeth of the retainer being steep left-hand helical edges which are continuous and are disposed diagonally crosswise of the crest of the right-hand thread of the bolt and which make the engagement with the crest of the thread of the bolt, the pitch of the left-hand helical edges of the teeth being much greater than the pitch of the right-hand bolt-thread,
         the teeth of the retainer having bolt-adjacent portions bent from the body of the retainer in the direction opposite to the direction of advance of the retainer on the bolt;
   whereby, when the retainer is advanced longitudinally on the bolt, the left-hand thread-engaging edges of the teeth of the retainer ride the crest of the right-hand thread of the bolt,
   and whereby, when force is applied to the retainer in the direction that would tend to retract the retainer on the bolt, the teeth of the retainer grip the bolt by toggle action and dig into the crest of the bolt-thread where the left-hand thread-engaging edges of the teeth of the retainer cross the crest of the right-hand thread of the bolt.

2. A captive-bolt assembly as in claim 1 in which the retainer is made of spring metal.

3. A captive-bolt assembly as in claim 1 in which the bolt is made of metal and the retainer is made of spring metal.

4. A captive-bolt assembly as in claim 3 in which the bolt and retainer are made of ferrous metal.

5. A captive-bolt assembly as in claim 1 in which the bolt is made of mild steel and the retainer is made of spring steel.

6. A captive-bolt assembly as in claim 1 in which the retainer has at least four teeth.

7. A captive-bolt assembly as in claim 1 in which the bolt hole in said member is of a size and shape affording lateral adjustment of the bolt in the bolt hole and said retainer frictionally engages the face of said member which is to confront the second member and holds the bolt in laterally-adjusted position in said bolt hole.

8. A captive-bolt assembly as in claim 1 in which the teeth of said retainer, upon being clampingly engaged and forced toward said member, are adapted to return to the general level of the body of the retainer, the bolt-confronting edges of the teeth settling into the groove of the bolt-thread.

9. A captive-bolt assembly as in claim 8 in which the bolt is made of mild steel and the retainer is made of spring steel.

References Cited

UNITED STATES PATENTS

| | | | |
|---|---|---|---|
| 986,255 | 3/1911 | Whitney | 151—30 |
| 2,314,489 | 3/1943 | Fennema | 151—69 |

EDWARD C. ALLEN, *Primary Examiner.*